United States Patent [19]

Mozer

[11] Patent Number: 4,888,873
[45] Date of Patent: Dec. 26, 1989

[54] NAVIGATION APPARATUS

[76] Inventor: Claude Mozer, Chemin des Clochettes 16, 1206 Geneve - Canton of Geneva, Switzerland

[21] Appl. No.: 238,743

[22] Filed: Aug. 31, 1988

[30] Foreign Application Priority Data

Sep. 8, 1987 [CH] Switzerland ............... 3463/87

[51] Int. Cl.$^4$ ............................................. G03B 21/00
[52] U.S. Cl. ................................................. 33/1 SD
[58] Field of Search ................ 33/1 SD, 1 SB, 1 SC, 33/1 SA, 1 CC, 431

[56] References Cited

U.S. PATENT DOCUMENTS

| | | | |
|---|---|---|---|
| 2,407,893 | 9/1946 | Meyer | 33/1 SD |
| 3,094,781 | 6/1963 | Vangor | 33/1 SD |
| 3,643,333 | 2/1972 | Pepper | 33/1 SD |
| 3,724,079 | 4/1973 | Jasperson | 33/1 SD |
| 3,844,041 | 10/1974 | Wilson | 33/1 SD |

FOREIGN PATENT DOCUMENTS 93227 11/1938 Sweden ............................ 33/1 SD Primary Examiner—Harry N. Haroian
Attorney, Agent, or Firm—Silverman, Cass & Singer, Ltd.

[57] ABSTRACT

Apparatus providing an aid to navigation comprising two circular discs which are superposed and rotatably mounted with respect to one other, the upper disc presenting a transparent zone corresponding to a geographical area, for instance a closed stretch of water, with indication of some coastal places or localities. The latter disc carries moreover a peripheral circular graduation divided over 360°, the "0" point of which is situated to the north of said geographical area. So far as the base disc is concerned, its upper face is provided with parallel straight lines and carries two indexes situated at the ends of the diameter parallel to these lines. It is sufficient, to determine the course to be followed for travelling from one of the indicated places to another, to rotate the rotatable disc with respect to the stationary disc to bring the points corresponding to these two places to lie on one and the same line of the set of parallel lines. The index of the base disc which is closest to the "0" point then indicates the correct course with respect to the graduation.

8 Claims, 1 Drawing Sheet

NAVIGATION APPARATUS

BACKGROUND OF THE INVENTION

1. Field of the Invention

The present invention relates to navigation apparatus, more particularly to apparatus enabling a nautical or aerial navigator, but preferably nautical, to determine easily, for a given limited area, for instance a closed stretch of water, the course to be followed when travelling from one place to another within this area, especially from one coastal location to another coastal location.

The determination of the course to be followed to travel from one place to another normally involves a procedure which, without being unduly complicated, does however need some navigational expertise which is not within the competence of all yachtsmen, and use of instruments (protractor, rule of CRAS or others). It is moreover necessary to be able to spread out a map or chart, which is not always easy on a boat of small size, not well equipped for this kind of operation, and especially when conditions for navigation are difficult.

SUMMARY OF THE INVENTION

The object of the present invention is to overcome the foregoing difficulties while furnishing navigation apparatus enabling the course to be followed, to travel from one point to another within a given area, easily to be determined.

This object is achieved due to the fact that the present apparatus comprises a disc at least a part of which is transparent and which is applied on the upper face of a base element on which it is rotatably mounted, one of said elements— said disc and said base element-displaying a geographical map of the area where the navigation has to take place and a circular graduation divided in degrees, the center of which graduation coincides with the center of rotation of the disc and the "0" point of which is situated at the north of said area, and in which the other one of said elements—said base element and said disc—is provided with parallel straight lines and with at least one peripheral index so positioned that a radius extending from the center of rotation of the disc and passing through said index is parallel to the direction of said straight lines, the arrangement being such that, by rotating the disc with respect to the base element to bring points of the geographical map respectively indicating two places thereon so that said points are situated on one and the same line of said parallel lines, the disc is placed in an angular position such that the index indicates, with respect to the circular graduation, the course which a navigator has to follow to travel from one of said two places to the other one thereof.

The various features of the invention will be apparent from the following description, drawings and claims, the scope of the invention not being limited to the drawings themselves as the drawings are only for the purpose of illustrating ways in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENTS

Figure 1:
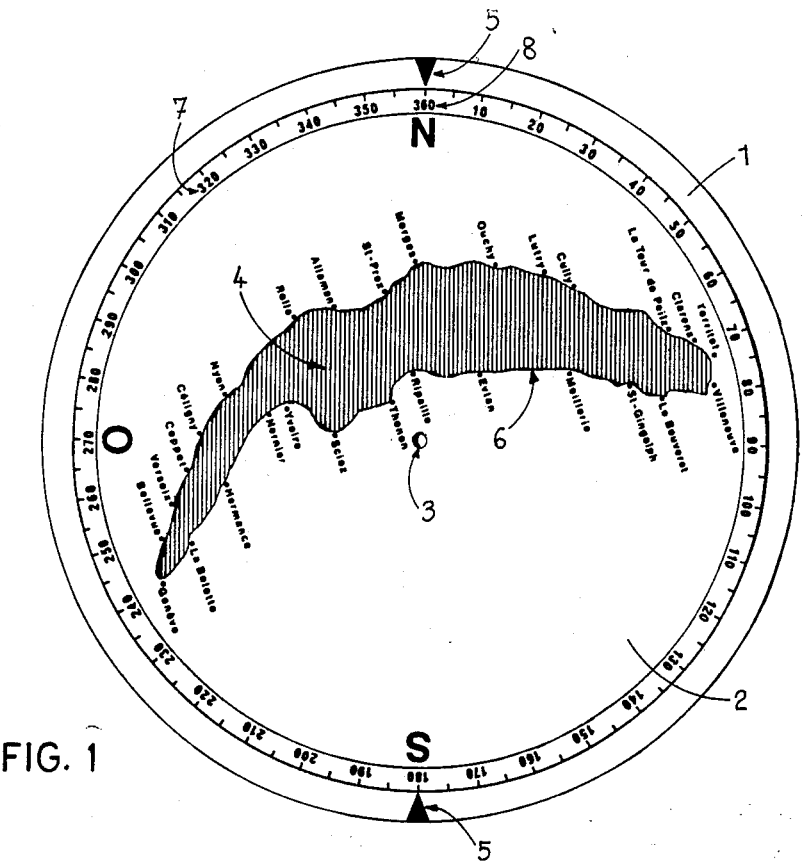
FIG. 1 is a plan view of navigation apparatus in accordance with the invention.
Figure 2:
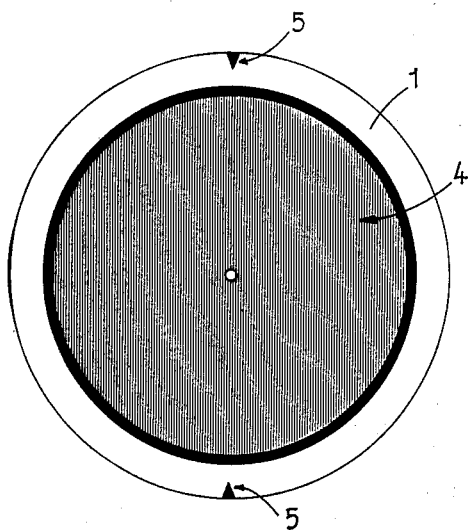
FIGS. 2 and 3 are respectively plan views of two constituent elements of the apparatus, to a reduced scale.
Figure 3:
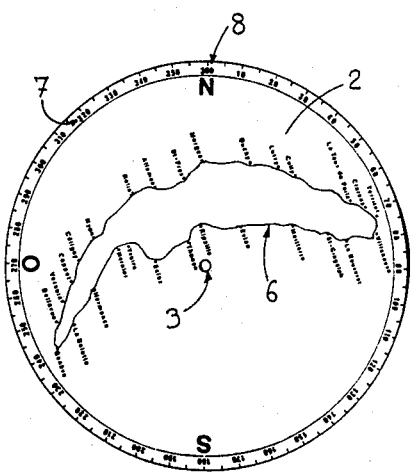

The apparatus as illustrated comprises two superposed circular discs, disposed coaxially with respect to one other and one of which, the lower one designated by the reference 1, is stationary while the other one, the upper one designated by the reference 2, is rotatably mounted on the first one. The center of rotation of the disc element 2, designated by the reference 3, coinciding with the center of the two discs 1 and 2.

The base element 1 carries, traced on its upper face, parallel straight lines 4 occupying its whole central part, and it is provided at the periphery with two indexes 5. The indexes 5 are diametrically opposed, being situated at the ends of the diameter of the disc which is parallel to the lines 4.

So far as the upper disc 2 is concerned, it is provided with a transparent zone 6, the configuration of which corresponds to the configuration of the geographical area, preferably a closed stretch of water, in which the navigator desires to travel. In the example represented, the transparent zone 6 of the disc 2 represents Lake Geneva. The main places or localities of the shores of this lake are indicated on this disc by means of dots showing their position, each dot being provided with a printed identification of the indicated place or locality. Finally, the disc 2 carries, at its periphery, a circular graduation 7, subdivided through a range of 360°, the "0" point of which, indicated at 8, coincides with the compass north of the area represented by the transparent part 6 of this disc.

The described apparatus is used as follows:

The navigator desiring to determine the course to be followed for going from one point to another of the area of Lake Geneva, for instance from a place on the Lake shore to a place on the opposite shore, will rotate the disc 2 with respect to the base disc 1 to bring the two dots indicating these two places on one and the same of the straight lines 4 traced on the disc 1 and visible through the transparent zone 6. In other words, he will orientate the disc 2 in such a way that the straight line interconnecting the two places between which the navigation must take place is parallel to the diameter of the disc 1 passing through the two indexes 5. The disc 2 being in this position, that one of the indexes 5 of the disc 1 which is positioned closest to the "0" point of the graduation 7 indicates directly, with respect to this graduation, the course to be followed when travelling between the chosen places, expressed in degrees.

As a modification, and especially for use in aerial navigation, one can provide a display where the places indicated on the rotatable disc 2 are not only places situated at the boundary of the geographical area represented by the transparent zone of this disc, but also places situated within this area. It is to be understood that the transparent zone does not necessarily represent a stretch of water but any geographical area within which one wants to travel.

Obviously, each area will need its own specific apparatus, just as each area needs its own geographical map.

It is to be noted that the map constituted by the transparent zone 6 of the disc 2 could be placed in any position with respect to the center of rotation 3 the position of which is not critical. It is the "0" point of the graduation 7, as indicated at 8, the position of which is critical and which must be situated precisely to the north of the geographical area represented by the zone 6.

As a further modification, one could provide the construction where the geographical map and the circular graduation would be provided on the lower disc, the parallel right lines and the index being provided on the upper disc. In this case, it would be the central portion of the upper disc displaying the parallel lines which would be transparent.

As yet another modification, the apparatus, instead of being portable, could comprise a non-portable base element intended to be positioned, even secured, on a table and the upper face of which would carry the rotatable disc.

In the case of the portable apparatus such as described and illustrated, the discs can be made of any suitable material, plastic material or plastic coated cardboard, for instance, preferably provided that it is waterproof.

Finally, it is to be noted that apparatus in accordance with the invention could constitute excellent publicity material.

I claim:

1. Navigation apparatus comprising a disc at least a part of which is transparent, said disc being applied on the upper face of a base element on which it is rotatably mounted and one of said elements —said disc and said base element—displaying a geographical map of the area where the navigation has to take place and a circular graduation divided in degrees, the center of which graduation coincides with the center of rotation of the disc and the "0" point of which is situated at the north of said area, and in which the other one of said elements—said base element and said disc—is provided with parallel straight lines and with at least one peripheral index so positioned that a radius extending from the center of rotation of the disc and passing through said index is parallel to the direction of said straight lines, the arrangement being such that, by rotating the disc with respect to the base element to bring points of the geographical map respectively indicating two places thereon so that said points are situated on one and the same line of said parallel lines, the disc is placed in an angular position such that the index indicates, with respect to the circular graduation, the course which a navigator has to follow to travel from one of said two places to the other one thereof.

2. An apparatus as claimed in claim 1, in which the base element carries, on its upper face, said parallel lines and said index, while the rotatable disc carries said geographical map, appearing on its transparent part, and said circular graduation.

3. An apparatus as claimed in claim 1, in which the geographical map displays signs identifying places situated on the boundary of the area it represents.

4. An apparatus as claimed in claim 1, in which the geographical map displays signs identifying places situated within the area it represents.

5. An apparatus as claimed in claim 1, in which the area represented by the geographical map is a closed stretch of water.

6. An apparatus as claimed in claim 1, in which the base element carries, on its upper face, said geographical map and said circular graduation while the rotatable disc carries said parallel straight lines and said index, the parallel straight lines appearing on its transparent portion.

7. A navigation apparatus comprising:
   a disc member including at least one transparent portion, said transparent portion being constructed as a geographical map of the area which is desired to be navigated and a circular graduation positioned about its periphery divided in degrees, the center of said graduation coinciding with the center of rotation of said disc member and the "0" point of said graduation being positioned at the north of said geographical area; and
   a base element slightly larger than the diameter of said disc member, said disc member being rotatably mounted on an upper face of said base element, said upper face of said base element including a plurality of parallel lines and at least one peripheral index thereon, said parallel lines only being visible through said transparent portion of said disc member and said index being visible about the outer circumference of said disc member, said index being positioned on said base element so that a radius extending from the center of rotation of said base element and passing through said index is parallel to the direction of said parallel lines so that upon rotation of said disc member with respect to said base element at least two points on the transparent geographical map portion of said disc member can be connected by at least one of said parallel lines on said base element and said index of said base element indicates a degree on said circular graduation of said disc member, said degree corresponding to a course which a navigator can follow to travel from one point to the other on said transparent geographical map portion.

8. A navigation apparatus comprising:
   a base element having an upper face including a geographical map of the area to be navigated and a circular graduation positioned about its periphery divided in degrees, the center of said graduation coinciding with the center of rotation of said base element and the "0" point of said graduation being positioned at the north of said geographical area; and
   a disc member including at least one transparent portion, said transparent portion including a plurality of parallel lines thereon and substantially corresponding to the size of said geographical map of said base element, said disc member being rotatably mounted to said upper face of said base element having a diameter which can be contained within said circular graduation of said base element and including at least one peripheral index positioned thereon so that a radius extending from the center of rotation of said disc member and passing through said index is parallel to the direction of said parallel lines, so that upon rotation of said disc member with respect to said base element at least two points on said geographical map of said base element can be connected by at least one of said parallel lines on said transparent portion of said disc member and said index of said disc member indicates a degree on said circular graduation of said base element, said degree corresponding to a course which the navigator can follow to travel from one point to the other on said geographical map.

* * * * *